US007136943B2

(12) United States Patent
Kuo et al.

(10) Patent No.: US 7,136,943 B2
(45) Date of Patent: Nov. 14, 2006

(54) METHOD AND APPARATUS FOR MANAGING CONTEXT SWITCHES USING A CONTEXT SWITCH HISTORY TABLE

(75) Inventors: Wei Kuo, Austin, TX (US); James A. Pafumi, Leander, TX (US); Robert Paul Stelzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 10/803,629

(22) Filed: Mar. 18, 2004

(65) Prior Publication Data

US 2005/0228936 A1  Oct. 13, 2005

(51) Int. Cl.
*G06F 13/28* (2006.01)

(52) U.S. Cl. .............................. 710/22; 710/23; 711/1
(58) Field of Classification Search ............ 710/22–28, 710/52–57, 39
See application file for complete search history.

(56) References Cited

U.S. PATENT DOCUMENTS

| 5,127,098 | A |   | 6/1992  | Rosenthal et al. ......... 395/650 |
|-----------|---|---|---------|-----------------------------------|
| 5,155,822 | A |   | 10/1992 | Doyle et al. ............... 395/400 |
| 5,329,615 | A |   | 7/1994  | Peaslee et al. ............. 395/162 |
| 5,448,702 | A |   | 9/1995  | Garcia, Jr. et al. .......... 395/325 |
| 5,613,114 | A |   | 3/1997  | Anderson et al. .......... 395/678 |
| 5,619,720 | A |   | 4/1997  | Garde et al. |
| 5,644,784 | A |   | 7/1997  | Peek .......................... 395/844 |
| 5,761,532 | A |   | 6/1998  | Yarch et al. ............... 395/842 |
| 5,781,799 | A |   | 7/1998  | Leger et al. |
| 5,828,903 | A |   | 10/1998 | Sethuram et al. |
| 5,850,570 | A |   | 12/1998 | Shoji |
| 5,894,586 | A |   | 4/1999  | Marks et al. ............... 395/848 |
| 5,933,654 | A |   | 8/1999  | Galdun et al. |
| 5,974,480 | A | * | 10/1999 | Qureshi et al. ............... 710/27 |
| 6,075,938 | A |   | 6/2000  | Bugnion et al. ........ 395/500.48 |
| 6,092,127 | A |   | 7/2000  | Tausheck |
| 6,128,669 | A |   | 10/2000 | Moriarty et al. ............... 710/1 |
| 6,169,745 | B1 |  | 1/2001  | Liu et al. .................... 370/463 |
| 6,199,121 | B1 |  | 3/2001  | Olson et al. ................. 710/24 |
| 6,199,124 | B1 |  | 3/2001  | Ramakrishnan et al. ...... 710/40 |
| 6,324,598 | B1 |  | 11/2001 | Olson et al. ................. 710/24 |
| 6,324,599 | B1 |  | 11/2001 | Zhou et al. |
| 6,336,150 | B1 |  | 1/2002  | Ellis et al. |
| 6,425,054 | B1 |  | 7/2002  | Nguyen ..................... 711/117 |
| 6,519,265 | B1 |  | 2/2003  | Liu et al. .................... 370/463 |

(Continued)

FOREIGN PATENT DOCUMENTS

WO   WO 00/67131   11/2000

(Continued)

OTHER PUBLICATIONS

IBM Technical Disclosure Bulletin, "Table-Driven Hardware Controller", Aug. 1987, pp. 1013-1018.

(Continued)

*Primary Examiner*—Fritz Fleming
*Assistant Examiner*—Ernest Unelus
(74) *Attorney, Agent, or Firm*—Duke W. Yee; Marilyn Smith Dawkins; Rakesh Garg

(57) ABSTRACT

A method, apparatus and computer instructions for storing data relating to the switch in a context switch history containing a number of prior context switches occurring prior to a current context. The storing of data occurs in response to a change in context for a direct memory access resource. Portions of the direct memory access chain of requests are freed using the context switch history to form freed portions, wherein the freed portions are reused for requests.

20 Claims, 10 Drawing Sheets

U.S. PATENT DOCUMENTS

| | | |
|---|---|---|
| 6,647,456 B1 | 11/2003 | Van Dyke et al. .......... 711/105 |
| 6,667,988 B1 | 12/2003 | Liu et al. .................... 370/463 |
| 6,718,405 B1 | 4/2004 | Rogers |
| 6,954,818 B1* | 10/2005 | Kent .......................... 710/306 |
| 2002/0016873 A1 | 2/2002 | Gray et al. ................... 710/28 |
| 2002/0019843 A1 | 2/2002 | Killian et al. ............... 709/102 |
| 2002/0026543 A1* | 2/2002 | Tojima et al. ................ 710/22 |
| 2002/0108003 A1* | 8/2002 | Ellis et al. .................... 710/39 |
| 2004/0267982 A1 | 12/2004 | Jackson et al. |
| 2005/0033874 A1 | 2/2005 | Futral et al. |
| 2005/0138235 A1* | 6/2005 | Ali Khan et al. ............. 710/24 |

FOREIGN PATENT DOCUMENTS

WO     WO 03/001648     1/2003

OTHER PUBLICATIONS

U.S. Appl. No. 10/682,410, Pafumi et al., Method and Apparatus for Efficient Sharing of a DMA Resource, Oct. 9, 2003.

* cited by examiner

METHOD AND APPARATUS FOR MANAGING CONTEXT SWITCHES USING A CONTEXT SWITCH HISTORY TABLE

BACKGROUND OF THE INVENTION

Cross Reference to Related Applications

The present invention is related to an application entitled METHOD AND APPARATUS FOR EFFICIENT SHARING OF A DMA RESOURCE, Ser. No. 10/682,410, filed on Oct. 9, 2003, assigned to the same assignee, and incorporated herein by reference.

1. Technical Field

The present invention relates generally to an improved data processing system and in particular, to a method and apparatus for managing data transfers. Still more particularly, the present invention relates to a method, apparatus, and computer instructions for sharing DMA resources.

2. Description of Related Art

In data processing systems, data is transferred within a data processing system using different mechanisms. One mechanism is direct memory access (DMA), which allows for data transfers from memory to memory without using or involving a central processing unit (CPU). For example, with DMA, data may be transferred from a random access memory (RAM) to a DMA resource, such as a hard disk drive, without requiring intervention from the CPU. DMA transfers also are used in sending data to other DMA resources, such as a graphics adapter or Ethernet adapter. In these examples, a DMA resource is any logic or circuitry that is able to initiate and master memory read/write cycles on a bus. This resource may be located on the motherboard of the computer or on some other pluggable card, such as a graphics adapter or a disk drive adapter.

Multiple user level threads often desire to use a DMA resource. In the graphics environment, the typical method for sharing a DMA resource is to assign the resource to some central facility, such as a graphics device driver running within the operating system kernel. User level threads, such as graphics threads, wishing to use the DMA resource send or place requests in a queue for the central facility in the kernel of the operating system. This central facility dequeues a request and presents the request to the DMA resource whenever the resource becomes idle.

This presently available mechanism is inefficient. For example, the DMA resource is idle while the central facility dequeues or obtains requests from the queue for processing. The user level thread has to make an operating system call. This operating system call is also referred to as a service call (SVC).

Therefore, it would be advantageous to have an improved method, apparatus, and computer instructions for sharing DMA resources.

SUMMARY OF THE INVENTION

The present invention provides a method, apparatus and computer instructions for storing data relating to the switch in a context switch history containing a number of prior context switches occurring prior to a current context. The storing of data occurs in response to a change in context for a direct memory access resource. Portions of the direct memory access chain of requests are freed using the context switch history to form freed portions, wherein the freed portions are reused for requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
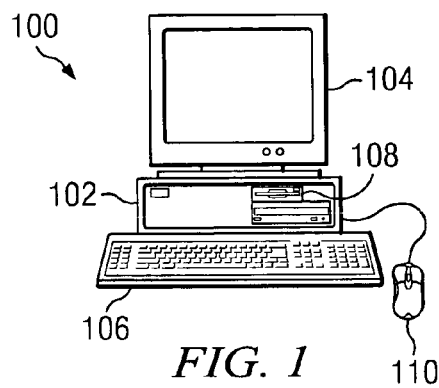
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
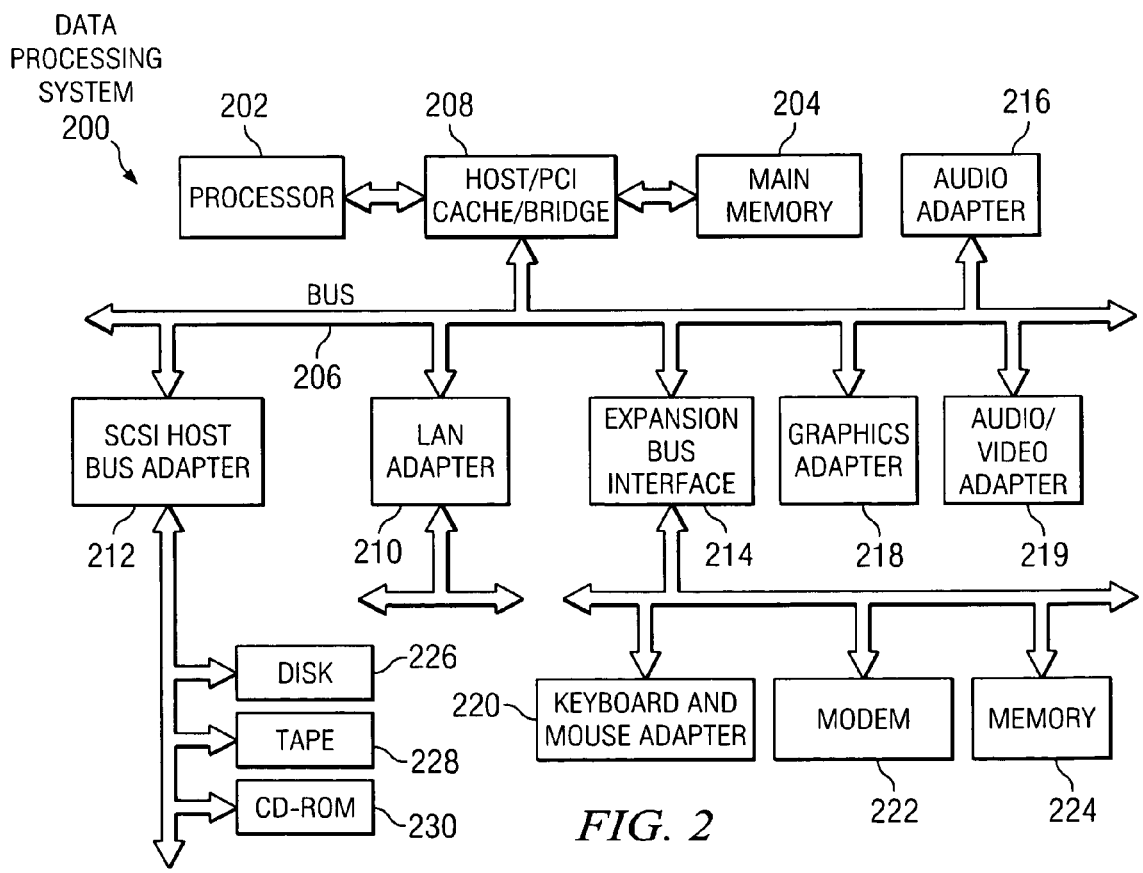
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer instructions for sharing DMA resources in which memory used in sharing DMA resources may be freed when no longer needed. The mechanism of the present invention allows user level threads to directly enqueue or place requests to transfer data on a queue for the DMA resource. Additionally, in the illustrative examples, a central facility in the operating system manages the amount of time during which a particular thread may use the DMA resource. Further, addressability of the queue is provided to a new thread when DMA ownership transfer occurs by using a zero length DMA request in these examples. In this manner, the mechanism of the present invention provides a seamless approach for sharing a DMA resource between different requesters, such as user level threads for applications. This mechanism provides for sharing of the resource without inefficiencies interjected by the use of service calls for each request or through idle cycles in DMA transfers that occur when each data transfer is handled through a request to a control facility in an operating system.

Storing of data occurs when switch in a context occurs. The stored data is a history of a number of prior context switches occurring prior to a current context. The storing of data occurs in response to a change in context for a direct memory access resource in these illustrative examples. Portions of the direct memory access chain of requests are freed using the context switch history to form freed portions, wherein the freed portions are reused for requests. The history also may be used for debugging operations in the illustrative examples.

Figures 3, 5:
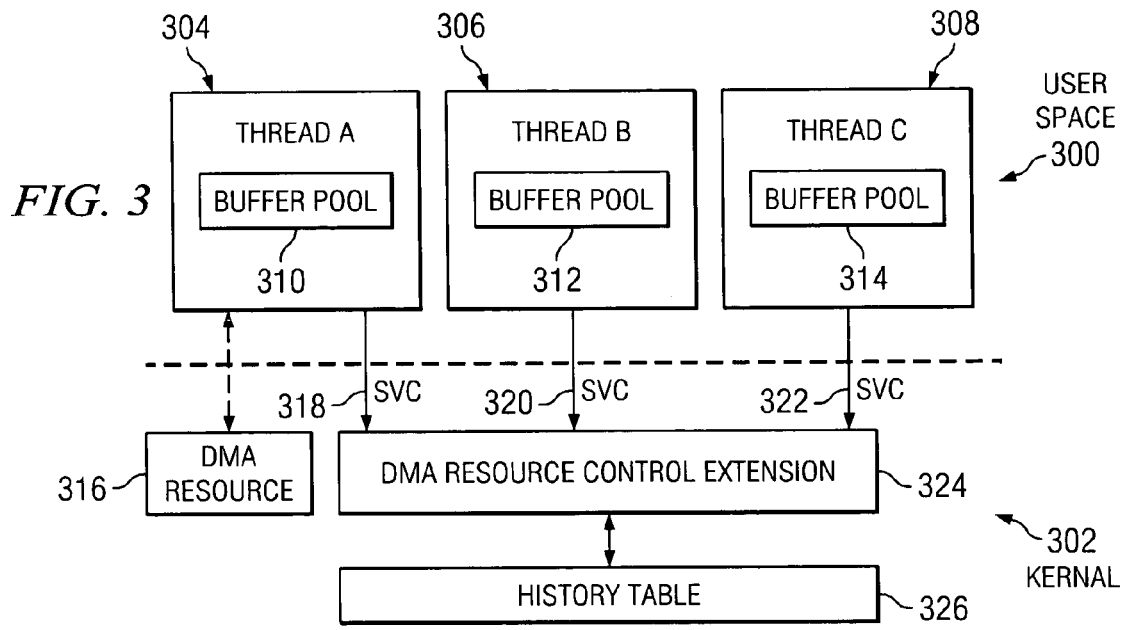
FIG. 3 is a diagram illustrating components used in DMA resource sharing in accordance with a preferred embodiment of the present invention.
FIG. 5 is a diagram of a context switch history table in accordance with a preferred embodiment of the present invention.

With reference now to FIG. 3, a diagram illustrating components used in DMA resource sharing is depicted in accordance with a preferred embodiment of the present invention. As illustrated, user space 300 and kernel 302 are present in which user space 300 includes thread A 304, thread B 306, and thread C 308.

As shown, each of these threads contains a buffer pool, in which the buffer pool is only known by and accessible to the thread owning the pool and operating system kernel 302. Buffer pool 310 is owned by thread A 304; buffer pool 312 is owned by thread B 306; and buffer pool 314 is owned by thread C 308. All of these threads desire to access DMA resource 316 in this illustrative example. Each of these threads initially makes a service call, SVC 318, SVC 320, and SVC 322, to DMA resource control extension 324 within kernel 302. These calls are to request DMA service and to map the pool buffers for DMA data transfers. In these examples, mapping refers to the operation or operations required such that the buffer's virtual memory may be accessed by DMA resource 316. Such mapping is typically provided by most modern operating systems.

In this example, thread A 304 is initially given access to DMA resource 316. The other threads, thread B 306 and thread C 308, are placed into a sleep mode until they are provided with access or ownership of DMA resource 316. When some criteria or event, such as some selected amount of time has elapsed, DMA resource control extension 324 removes access to or ownership of DMA resource 316 from thread A 304 and provides the next thread, thread B 306, access or ownership to DMA resource 316. Later, thread C 308 is provided with access to DMA resource 316 when DMA resource control extension 324 decides that it is time to change ownership of DMA resource 316. Maximum bus transfer rates are approached by tuning the time slice appropriately for the threads in these examples.

In these examples, access to DMA resource 316 is defined within the facilities provided by the operating system in kernel 302. The facility may, for example, take the form of a spin lock or a granting and revoking of addressability to DMA resource 316. In the later case, DMA resource control extension 324 provides a handler that places the threads in a sleep mode until the thread is to obtain ownership or access to DMA resource 316. When a thread has access to DMA resource 316, DMA transfers using this resource can be made without sending additional requests to DMA resource control extension 324 in these illustrative examples. In this manner, inefficiencies currently present with having to send a request for each DMA transfer directly to a central facility, such as DMA resource control extension 324, are avoided.

In these examples, DMA resource 316 includes an ability to process a list or chain of requests. In other words, DMA resource 316 may handle multiple requests that are chained or placed in a list such that DMA resource 316 may process each of these requests without intervention from DMA resource control extension 324. The chain or list of requests may be implemented through various control structures. In the illustrative examples, the control structure may contain items, such as a transfer length, transfer direction, location of data, and location of next control structure.

The request chain also may be constructed using a traditional scatter/gather table. Some applications may need to read or write data to multiple buffers, which are separated in a memory. Although this reading or writing may be performed with multiple calls, it is typically insufficient with the overhead associated with each kernel call. As a result, many platforms provide high-speed primitives to perform scatter/gather operations in a single kernel cell. When a read function occurs, data is read from files and scattered into buffers in a vector. As each buffer is filled, the data is then sent to the next buffer. With a write function, data is gathered from the buffers described in the vector and written into the files. As each buffer is written, the process moves on to the next buffer for writing. In this manner, an efficient reading and writing of buffers is performed.

As previously stated, DMA resource control extension 324 grants ownership for DMA resource 316 to a single thread for some period of time. After the period of time expires, DMA resource control extension 324 revokes the ownership from that thread and grants ownership to a new thread. Normally, the new thread that receives ownership of DMA resource 316 would be unable to access the DMA request chain built by the previous owner of DMA resource 316 because the associated memory does not reside within the address space of the new thread. However, a mechanism of the present invention includes an additional feature that provides the new owner of the DMA resource with access to the DMA request chain. After granting ownership of the DMA resource to a different thread, DMA resource control extension 324 generates a zero transfer length DMA request using the memory from the buffer pool of the new owner and connects this request to the end of the DMA request chain. The request chain is now accessible by the new owner so that this owner may immediately start adding requests to the DMA request chain when it resumes execution. In this manner, the mechanism of the present invention provides a seamless approach to sharing a DMA resource without the inefficiencies injected by requiring a service call for each DMA transfer request or injected by waiting for the DMA resource to go idle before switching ownership.

Additionally, history table 326 may be accessed by DMA resource control extension 324. In these examples, history table 326 contains data relating to prior context switches for DMA resource 316. This table keeps track of a number of prior context switches, such as the last 16 context switches. In the illustrative examples, the data relating to the context switches is stored in a circular list in the table. The information in history table 326 may be used for freeing memory, such as those used for DMA request chains. These chains also are referred to as "user queues". Also, the table may be used for debugging purposes.

Figure 4:
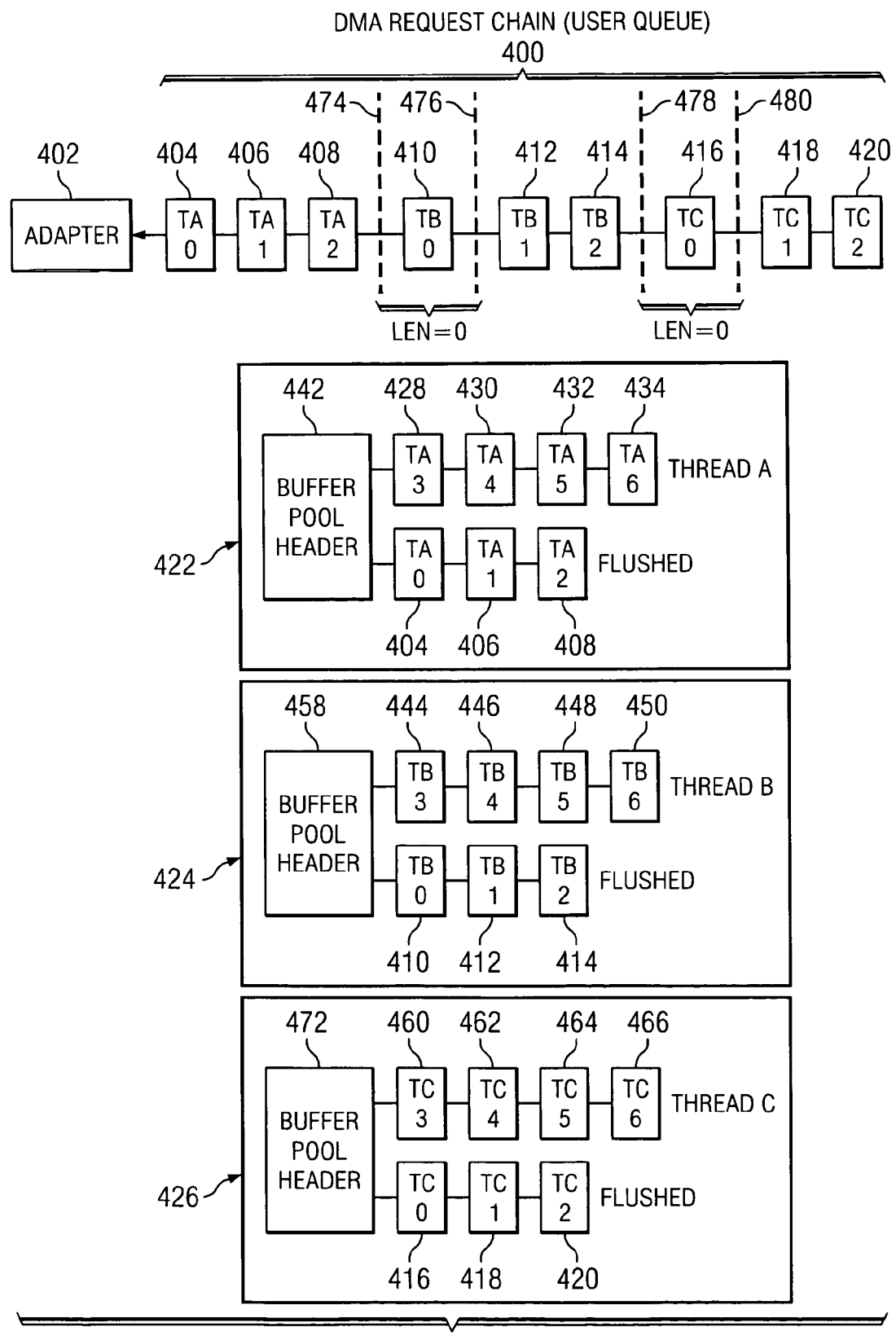
FIG. 4 is a diagram illustrating a chain of DMA requests in accordance with a preferred embodiment of the present invention.

Turning now to FIG. 4, a diagram illustrating a chain of DMA requests is depicted in accordance with a preferred embodiment of the present invention. In this example, request chain 400, also called a user queue, is handled by DMA resource 402, which is a graphics adapter in these examples.

Request chain 400 includes buffers 404, 406, 408, 410, 412, 414, 416, 418, and 420 in these examples. Buffers 404, 406, and 408 originate from buffer pool 422, which corresponds to buffer pool 310 for thread A 304 in FIG. 3. Buffers 410, 412, and 414 originate from buffer pool 424. This buffer pool corresponds to buffer pool 312 for thread B 306 in FIG. 3. Buffers 416, 418, and 420 are from buffer pool 426, which corresponds to buffer pool 314 for thread C 308 in FIG. 3.

In these examples, each buffer pool has a buffer pool header, which contains implementation of dependent information concerning the buffer pool, as well as the anchor points for two separate buffer lists. One list contains those buffers, which have been flushed or enqueued to the DMA resources for processing, and the other list contains those buffers, which are not currently being used. These lists are used by the thread to track buffer utilization and are not used by the DMA resource. When a new request is desired, first the thread recovers any buffers that have already been processed moving them from the flush list to the available list. Then, the thread selects the first buffer from the available list, fills this first buffer with data as required, appends the buffer to the chain of DMA requests for the DMA resource, and moves the buffer from the available list to the flushed list.

The depiction for buffer pool 422 shows such a pool header 442 and two buffer lists. The "Flushed" list contains buffers 404, 406, and 408 in the order in which they were enqueued to adapter 402. Buffers 428, 430, 432, and 434 form the list of available buffers, which may be used for future DMA requests.

Buffer pool 424 consists of available buffers 444, 446, 448, and 450 that may be sent to DMA resource 316 for transfer in these examples. Additionally, flushed buffers 410, 412, and 414 are present in buffer pool 424. These buffers are ones that have been appended to request chain 400. All of these buffers are identified through buffer pool header 458. In buffer pool 426, available buffers 460, 462, 464, and 466 are present. Also, flushed buffers 416, 418, and 420 are present in buffer pool 426. All of these buffers are provided with anchor points in buffer pool header 472.

In these examples, thread A 304 in FIG. 3 is initially given access to DMA resource 402 by the DMA resource control extension. Thread A then enqueues requests to adapter 402 forming request chain 400.

Later, when a switch occurs as indicated by lines 474 and 476, the DMA resource control extension revokes ownership of the DMA resource to the first thread and grants it to the second thread. In this example, thread B 306 is the thread granted access to the DMA resource. The DMA resource control extension then takes a buffer from the new thread's buffer pool, such as buffer 410 in buffer pool 424, and adds that buffer to DMA chain 400. The buffer is added with a zero length setting so that the buffer is ignored by DMA resource 402. At this time, thread B is able to add additional buffers, buffers 412 and 414 to DMA chain 400.

A second switch in these examples is illustrated by lines 478 and 480. At this point, a third thread, thread C, has been granted access to DMA resource 402. This thread is provided with an anchor point to add additional requests to DMA chain 400 through the DMA resource control extension adding buffer 416 to DMA chain 400. This buffer also has a length of zero causing DMA resource 402 to ignore this request. Without buffers 410 and 416 being added by the DMA resource control extension, the different threads would be unable to add requests to DMA chain 400 because access to the buffer at the end of the chain would be unavailable.

With this mechanism, a DMA resource, such as an adapter, reports the location of the current DMA control block that is being processed. The DMA control block contains information such as the DMA direction, the DMA bus address, etc. for the DMA transfer. The DMA control block is stored in each user queue. When a new queue is flowed to the adapter, the flush list may be examined backward to identify a match with the adapter's DMA control address. The flush list is linked backward, the newest flushed queue is linked at the top of the list and the oldest queue is linked at the end of the list. All of the queues prior to the matched control block may be freed. In some cases, however, while working ahead, free queue may be unavailable before the flush takes place. The mechanism of the present invention uses a history table, such as history table 326 in FIG. 3 to facilitate freeing of resources.

Freeing of resources may occur in different ways using the history table. For example, an application may call device drivers when a free user queue is unavailable. In this instance, the device driver uses the history table to identify and free queues that have been processed. In another example, the device driver may free queues each time a context switch occurs.

Turning now to FIG. 5, a diagram of a context switch history table is depicted in accordance with a preferred embodiment of the present invention. Context switch history table 500 is an example of a history table, such as history table 326 in FIG. 3.

Context switch history table 500 contains sixteen entries, such as entries 502, 504, 506, 508, 510, 512, 514, 516, 518, 520, 522, 524, 526, 528, 530, and 532 in this example. The entries may be arranged in a circular list within context switch history table 500. Each entry in context switch history table 500 contains data about a context switch for the DMA chain or user queue. In these illustrative embodiments, each entry includes the following fields: Rcxprivate, thread ID (TID), process ID (PID), save device buffer, and load device buffer. Rcxprivate contains a pointer to a data area for a data structure used in a DMA resource, such as a device driver. The thread ID is the identifier for the thread and the process ID is the identifier for the process involved in the DMA access. The field "save device buffer" contains a pointer to a device buffer used to fetch information, such as vertex state data for the context. The load device buffer field contains a pointer to the device buffer used to load the context onto the adapter. Current pointer 534 contains the address of the entry that describes the active rendering context.

Figure 6:
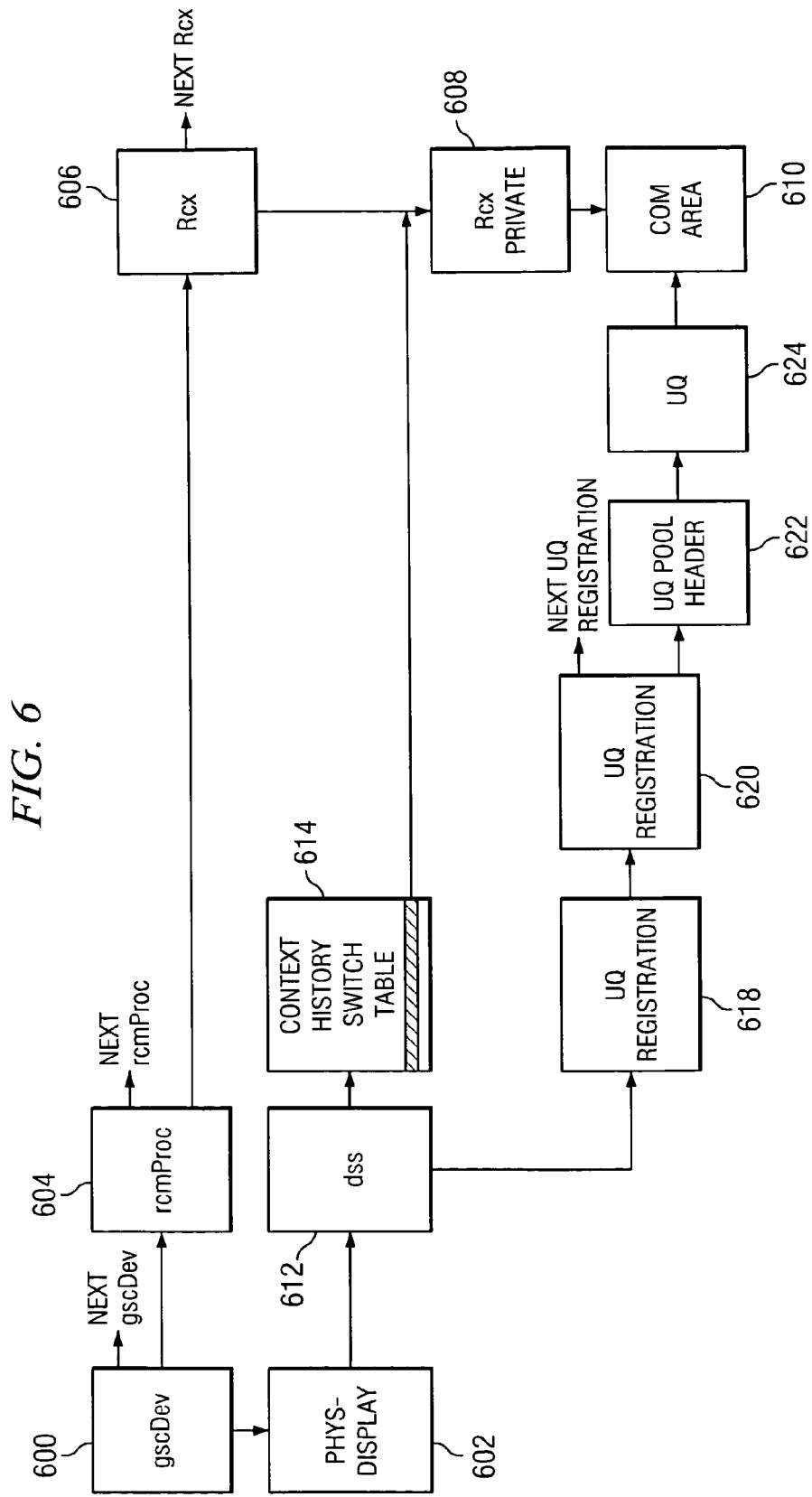
FIG. 6 is a diagram illustrating control blocks used by a device driver in accordance with a preferred embodiment of the present invention.

With reference now to FIG. 6, a diagram illustrating control blocks used by a device driver is depicted in accordance with a preferred embodiment of the present invention. In this illustrative example, the control blocks are located in the kernel space, such as the graphics device driver. Each graphics adapter is associated with a structure, such as gscDev 600. For each graphics device, the render context manager (RCM) dynamically allocated a graphics device structure, such as gscDev 600 during configuration. This structure serves as the anchor point for all other RCM structures for the device.

This structure is linked to phys-display 602 and rcmProc 604. Each display driver allocates and initializes a phys-display structure, such as phys-display 602 during configuration. The display driver stores a pointer to the phys-display structure in the display driver's device switch structure, which is then added to the kernel device switch table. For each graphics process, RCM creates a rcmProc structure, such as rcmProc 604, during the graphics process open time. This structure is used to anchor the rendering context created by the process.

As illustrated, rcmProc 604 is connected to Rcx 606. Rcx 606 has its own private data area, RcxPrivate 608, that includes common area 610. Rcx 606 is the device independent part of the rendering context created by RCM. RcxPrivate 608 is the device specific part of the rendering context. Common area 610 is an area allocated by the graphics process then pinned by the device driver. The address of common area 610 is used as a handle to communicate between the graphics process and the device driver.

Next, phys-display 602 is connected to dss 612. The data structure, dss 612, is a device specific structure that holds information, such as context history switch table 614. This table is similar to history table 326 in FIG. 3. Additionally, dss 612 also points to user queue registration 618. A graphics process may create one or more user queue pools. The entire user queue region is registered with the device driver via a graphics system call. During the registration process, the device driver pins and maps the allocated region to allow for DMA access by the adapter (i.e. DMA resource 316 in FIG. 3). The device driver also allocates a user queue registration structure, such as user queue registration 618, and links this data structure to the chain of user queue registration structures anchored off the device specific structure (dss), such as dss 612. This structure holds such information as the process ID of the creating process, the type of application (Xserver, OpenGL, Phigs), the virtual address, physical address, the length of the user queue pool region, and a cross memory handle. User queue registration 620 points to user queue pool header 622. This header also is referred to as a buffer pool header, such as buffer pool header 442 in FIG. 4. This header points to user queue 624.

Figure 7:
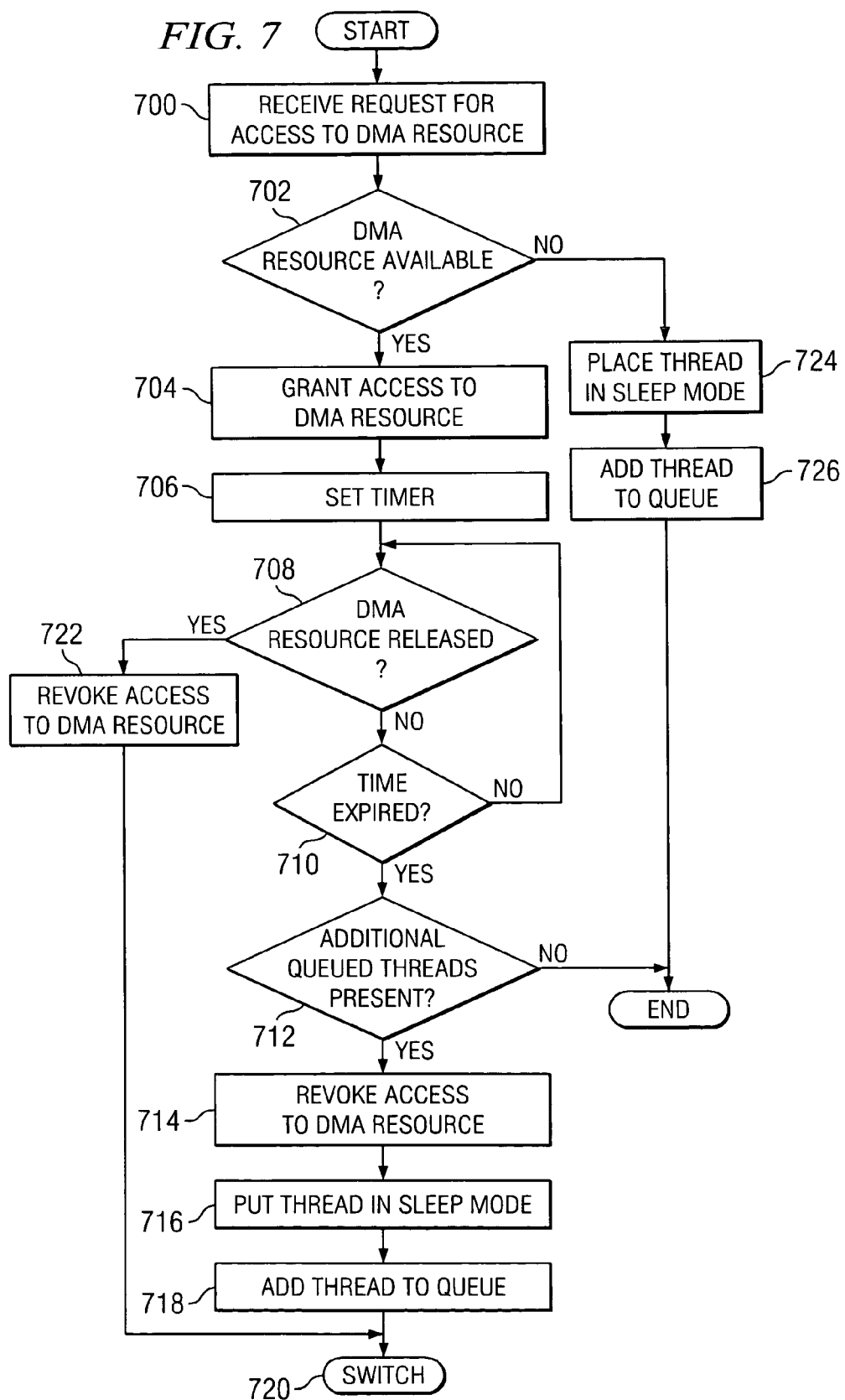
FIG. 7 is a flowchart of a process for placing threads on a queue in accordance with a preferred embodiment of the present invention.

Turning now to FIG. 7, a flowchart of a process for placing threads on a queue is depicted in accordance with a preferred embodiment of the present invention. The process illustrated in FIG. 7 may be implemented in a operating system component, such as DMA resource control extension 324 in FIG. 3.

The process begins by receiving a request for access to a DMA resource (step 700). A determination is made as to whether the DMA resource is available (step 702). If the DMA resource is available, access is granted to the DMA resource (step 704). Thereafter, a timer is set (step 706). A determination is made as to whether the thread has released the DMA resource (step 708). If the thread has not released the DMA resource, a determination is made as to whether the time for the timer has expired (step 710). If the timer has not expired, the process returns to step 708. If the timer has expired, a determination is made as to whether additional queued threads are present (step 712). If additional threads are not present then the process terminates. Otherwise, the current thread's access to the DMA resource is revoked (step 714), the current thread is placed into sleep mode (step 716), the current thread is added to the queue (step 718), and a switch occurs as described in FIG. 8 (step 720).

Figure 8:
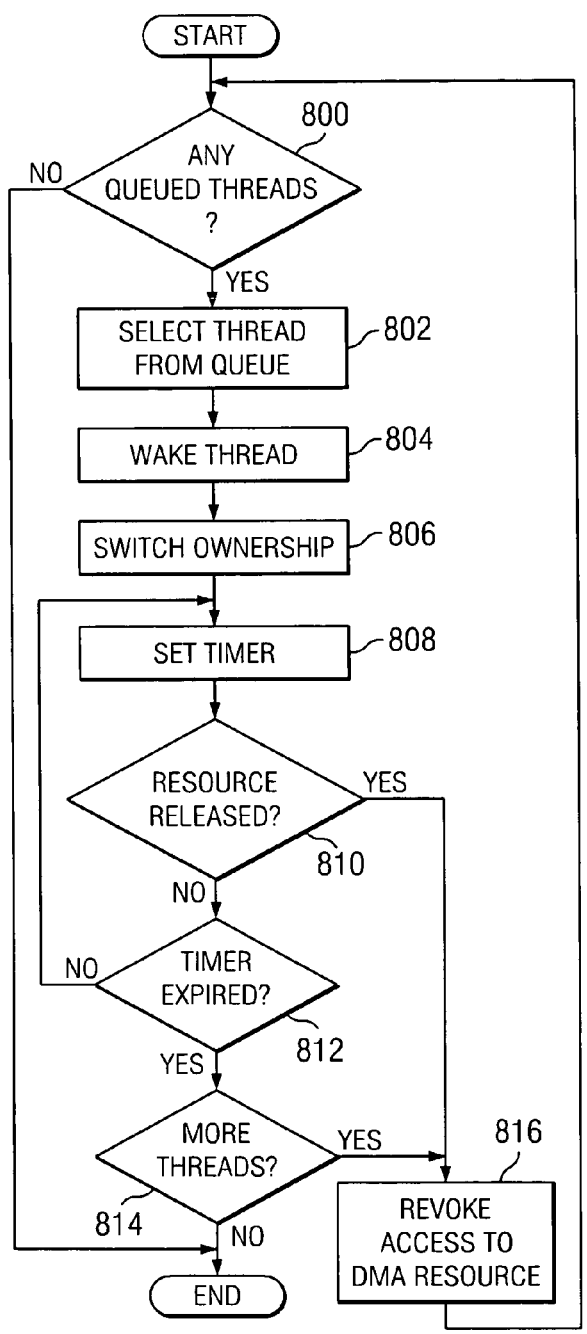
FIG. 8 is a flowchart of a process for switching between different threads in accordance with a preferred embodiment of the present invention.

With reference back to step 708, if the DMA resource has been released by the thread, access to the DMA resource is revoked (step 722) and a switch occurs as described in the process in FIG. 8 (step 720).

With reference again to step 702, if the DMA resource is unavailable, this thread is placed in a sleep mode (step 724), and the thread is added to a queue (step 726) with the process terminating thereafter. When an event, such as the expiration of a timer occurs for a time slice, the next thread in the queue may be selected and granted access to the DMA resource.

Turning now to FIG. 8, a flowchart of a process for switching between different threads is depicted in accordance with a preferred embodiment of the present invention. The process illustrated in FIG. 8 may be implemented in a kernel component, such as DMA resource control extension 324 in FIG. 3 in these examples.

The process begins by determining whether queued threads are present (step 800). This step is used to determine whether any threads are waiting for service. If queued threads are present, a new thread is selected from the queue (step 802). The thread selected is woken (step 804). Thereafter, the ownership of the DMA resource is switched to that thread (step 806). The change of ownership includes in these illustrative examples having the DMA resource control extension adding a buffer to the end of the chain. This buffer is selected from a buffer pool owned by the thread being granted ownership of the DMA resource. In this manner, the thread may now add additional requests to the DMA chain directly without needing aid from the kernel. Next, a timer is set (step 808).

A determination is made as to whether the resource has been released by the thread (step 810). If the resource has not been released, a determination is made as to whether the timer has expired (step 812). If the timer has not expired, the process returns to step 808. Otherwise, a determination is made as to whether additional threads are present (step 814). If additional threads are present, access to the DMA resource is revoked (step 816). In these examples, the timer corresponds to a time slice and is used to change ownership of the DMA resource for different time slices. Thereafter, the process returns (step 800) to determine whether a thread is present in the queue.

With reference again to step 814, if additional threads are not present, the access to the DMA resource is not revoked to allow the current thread to continue to access the DMA resource. With reference again to step 800, if queued threads are absent, the process terminates.

Figure 9:
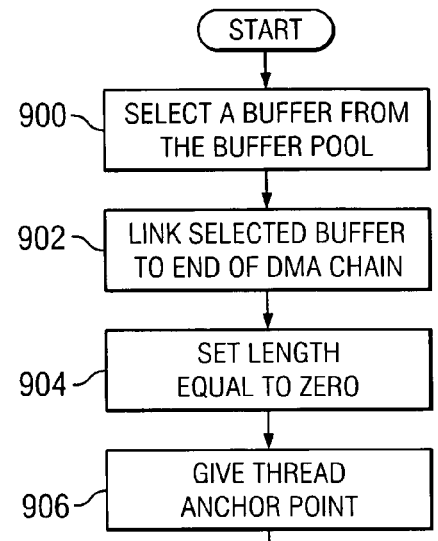
FIG. 9 is a flowchart of a process for providing an anchor point to a thread in accordance with a preferred embodiment of the present invention.

With reference now to FIG. 9, a flowchart of a process for providing an anchor point to a thread is depicted in accordance with a preferred embodiment of the present invention. The process illustrated in FIG. 9 may be implemented in a component, such as DMA resource control extension 324 in FIG. 3.

The process begins by selecting a buffer from a buffer pool (step 900). Thereafter, the selected buffer is linked to the end of the DMA chain (step 902). The length of the buffer is set equal to zero (step 904). This length is set equal to zero to cause the DMA resource to ignore the buffer. The anchor point is then given to the thread (step 906) with the process terminating thereafter. In this manner, this thread is now able to add additional requests to the DMA chain.

Figure 10:
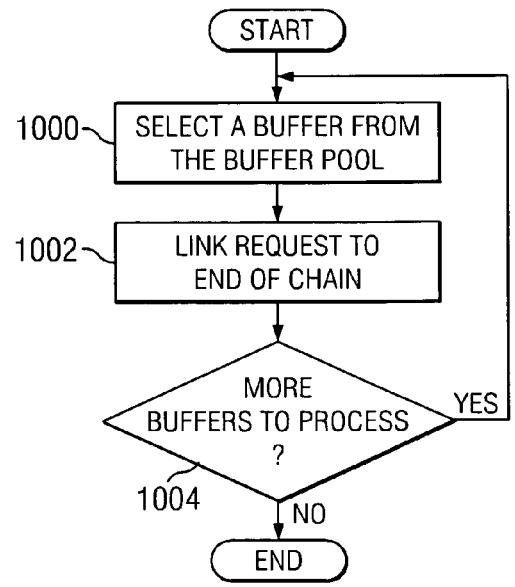
FIG. 10 is a flowchart of a process illustrating a thread adding buffers to a request chain in accordance with a preferred embodiment of the present invention.

With reference to FIG. 10, a flowchart of a process illustrating a thread adding buffers to a request chain is depicted in accordance with a preferred embodiment of the present invention. The process illustrated in FIG. 10 may be implemented in a thread, such as thread A 304 in FIG. 3.

The process begins by selecting a buffer from the buffer pool (step 1000). Next, this selected buffer is linked to the end of the request chain (step 1002). A determination is then made to whether additional buffers are present for processing (step 1004). If additional buffers are present, the process returns to (step 1000). Otherwise, the process terminates.

Figure 11:
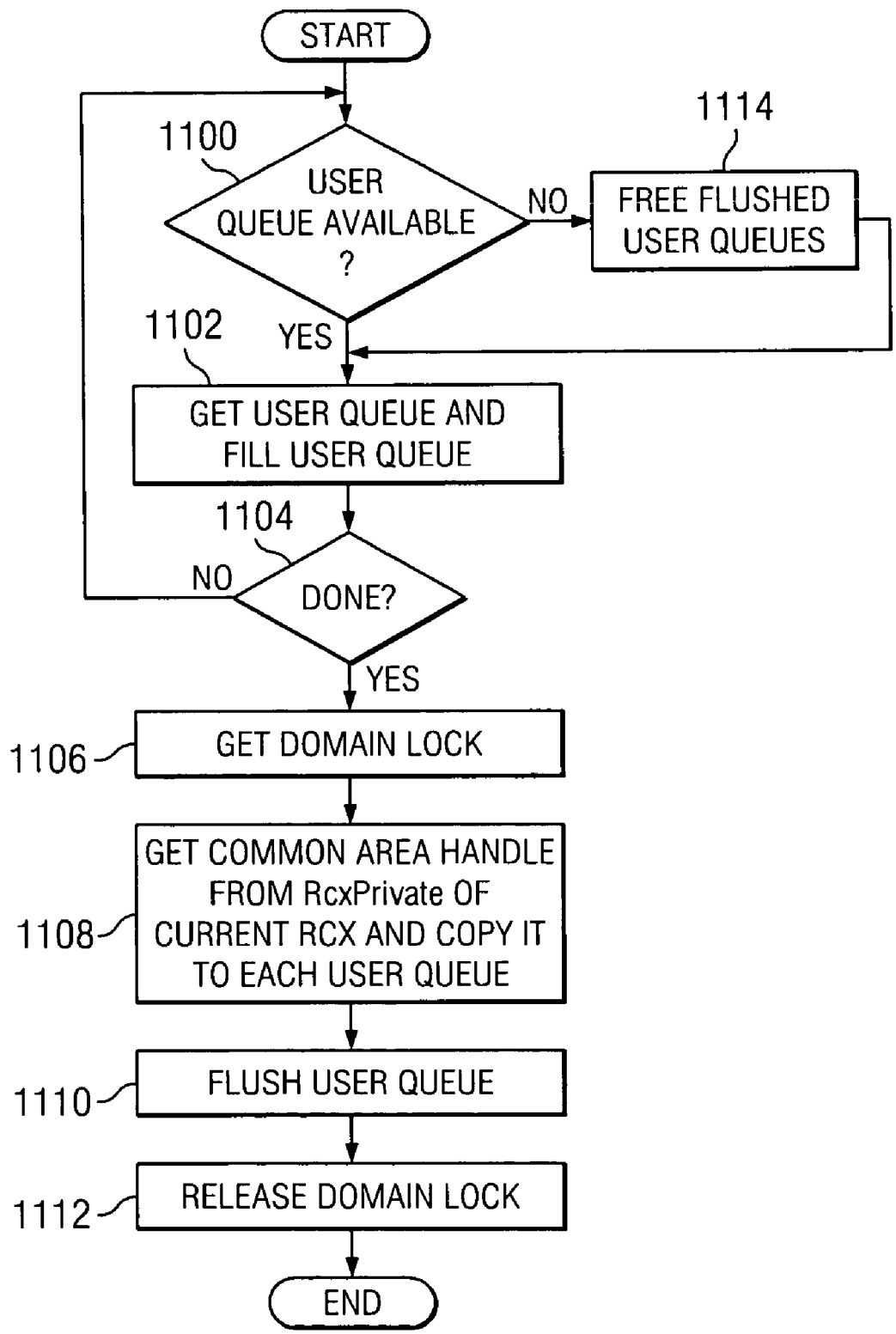
FIG. 11 is a flowchart of a process for flushing user queues in accordance with a preferred embodiment of the present invention.

With reference now to FIG. 11, a flowchart of a process for flushing user queues is depicted in accordance with a preferred embodiment of the present invention. The process illustrated in FIG. 11 may be implemented in a component, such as a graphics thread. A graphics thread may flush a user queue to a adapter by initiating the process illustrated in this figure.

This process links the DMA control block associated with the user queue being flushed to the DMA control block of the last user queue that was flushed. After flushing the buffer to the adapter, the user queue is placed on the flushed list and flagged as "flushed". In addition, the common area handle (i.e. address pointer) of the active rendering context is copied to each user queue being flushed before control is returned to the caller of this process. In these examples, a common area is bound to each Rcx when the Rcx is created and can not be deleted until after the Rcx has been deleted. The common area contains, among other items, pointers to the switch attribute buffers. The attribute buffers contain the graphics adapter state information.

The process begins by a determination being made as to whether a user queue is available (step 1100). If a user queue is available then the user queue is retrieved and filled (step 1102). Next, a determination is made as to whether this process is complete (step 1104). This determination as to whether the process is complete is made by determining whether additional rendering commands are present to be sent to the adapter by the application. If this process is complete then, the domain lock is retrieved (step 1106). A domain lock is defined for each device that is shared among all of the graphics processes. The purpose of this type of lock is to ensure that only one process can access the adapter at a time.

Then, the common area handle is retrieved from RcxPrivate of current RCX and copied to each user queue (step 1108). Next, the user queue is flushed (step 1110). Then, the domain lock is released (step 1112) with the process terminating thereafter.

Referring back to step 1100, if the user queue is not available, then flushed user queues are freed (step 1114). The process then proceeds to step 1102 as described above. Freeing of a user queue is described in more detail with reference to FIG. 12 below. Turning back to step 1104, if the process is not complete, then the process proceeds to step 1100 as described above.

Figure 12:
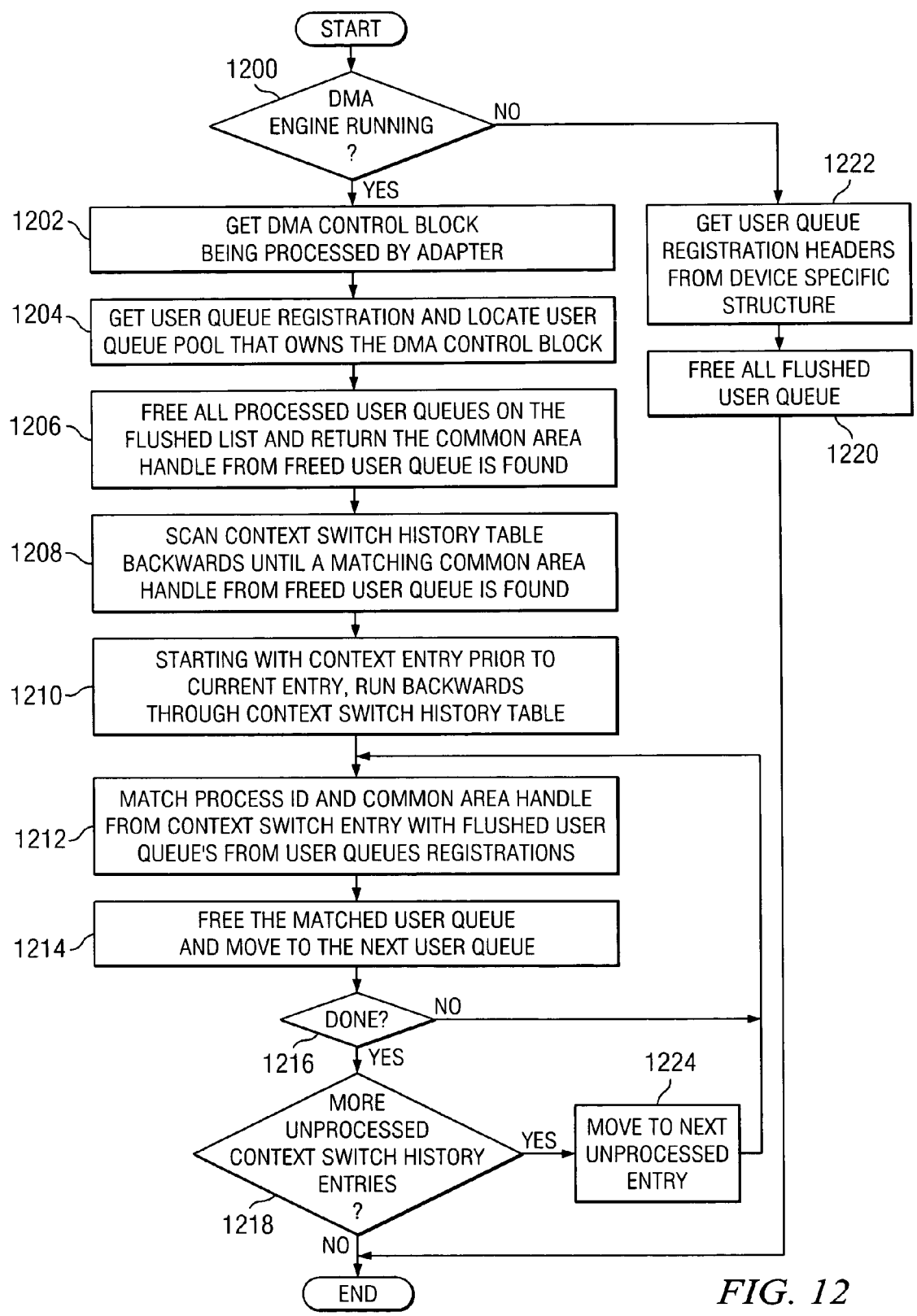
FIG. 12 is a flowchart of a process for freeing user queues in accordance with a preferred embodiment of the present invention.

With reference now to FIG. 12, a flowchart of a process for freeing user queues is depicted in accordance with a preferred embodiment of the present invention. The process illustrated in FIG. 12 may be implemented in a component, such as DMA resource 316 in FIG. 3. This process may be initiated by the DMA resource at the start of each context switch and also may be initiated if a free buffer is absent when user queues are to be flushed as described above in FIG. 11.

In this process, a check is made to determine if a DMA engine is running. If the DMA engine has stopped, then all of the user queue's have been processed. At that point, the process runs through all pools and frees all of the user queue's on the flushed list.

Otherwise, the DMA engine is running, and the address of the DMA control block currently being processed by the adapter is obtained. The user queue's pool that owns the DMA control block is located. In these examples, only one flushed list per process is present, and a user queue's pool is owned by and can be used by only one process now that the pool has been located the flushed list has also been located. All processed user queues on the flushed list are freed, and the pointer is returned to the common area specified in the call that flushed the user queue that is currently being bus mastered. Switch logic guarantees that a context will appear in the history table only once (i.e.: once context has been switched off, it can not be switched on until the switch off has been processed by an adapter and all processed resources have been freed). Thus, the scan context history switch table is scanned backwards until a match between common area handle (i.e. pointer) and entry represents the actual context currently switched onto the adapter.

The context currently on the adapter may not be the same context pointed to by the current pointer in the context switch history table. The process may queue context switch requests faster than the adapter could handle. Starting with context entry prior to current entry (i.e. the context currently on the adapter), the process runs backwards through the context switch history table freeing user queue's resources. This process frees up user queue's on flushed lists by matching the process ID and common area handle from the context switch history entry with the flushed user queue's lists.

With reference still to FIG. 12, the process begins by a determination being made as to whether a DMA engine is running (step 1200). If the DMA engine has stopped, all of the user queues have been processed. If the DMA engine is running, then the DMA control block being processed by an adapter is retrieved (step 1202). Next, user queue registration is retrieved and the user queue pool that owns the DMA control block is located (step 1204). Then, all processed user queues on the flushed list are freed and the common area handle from the freed user queue is found and returned (step 1206).

Next, a context switch history table is scanned backwards until a matching common are handle from the freed user queue is found (step 1208). Then, starting with context entry prior to current entry, the process scans through the entries in the context switch history table backwards (step 1210). By scanning or running through the table backwards, the process moves from a current entry towards less current entries. Next, the process ID and common area handle from context switch entry is matched with flushed user queue from user queue registrations (step 1212). The matched context switch entry represents the context currently switched onto the adapter. Then, the matched user queue is freed and moved to the next user queue (step 1214). Next, a determination is made as to whether the process is complete (step 1216). The process is complete in step 1216 if flushed user queues are unavailable. If the process is complete then a determination is made as to whether there are more unprocessed context switch history entries (step 1218). If there are not more unprocessed context switch history entries, then the process terminates.

Referring back to step 1200, if the DMA engine is not running, then retrieve user queue registration headers from device specific structure (step 1222). Next, all of the flushed user queues are freed (step 1220) with the process terminating thereafter. Turning back to step 1216, if the process is not complete, then the process returns to step 1212 as described above. Referring back to step 1218, if there are more unprocessed context switch history entries, then the process selects the next unprocessed entry (step 1224). The process then proceeds to step 1212 as described above.

Additionally, the context switch history table of the present invention may be used for debugging operations. In these examples, two different ways are illustrated for using the context switch history table for debugging purposes. All of the user queue's which have been flushed to the adapter may be collected according to the latest sixteen context switch entries. Alternatively, the specific user queue that is problematic may be located.

For example, if the adapter has encountered a bad hardware address from a command on the user queue, then the device driver can retrieve the bad address from the adapter. The driver then may start from the current context switch history table entry and retrieve the common area handle and process ID from the context switch history entry. By using the bad hardware address, common area handle, and process ID as parameters, the device driver may search through the entire user queue flushed list to find a match. If no match is found in the search, then an entry prior to the current entry is identified and the process returns to retrieve the common area handle and process ID from the selected entry. These steps are repeated until a match is found. This is just one example of how the history table may be used. Searching is performed through the context switch history table, starting from the current context switch entry and searching backward until a match is found.

Figure 13:
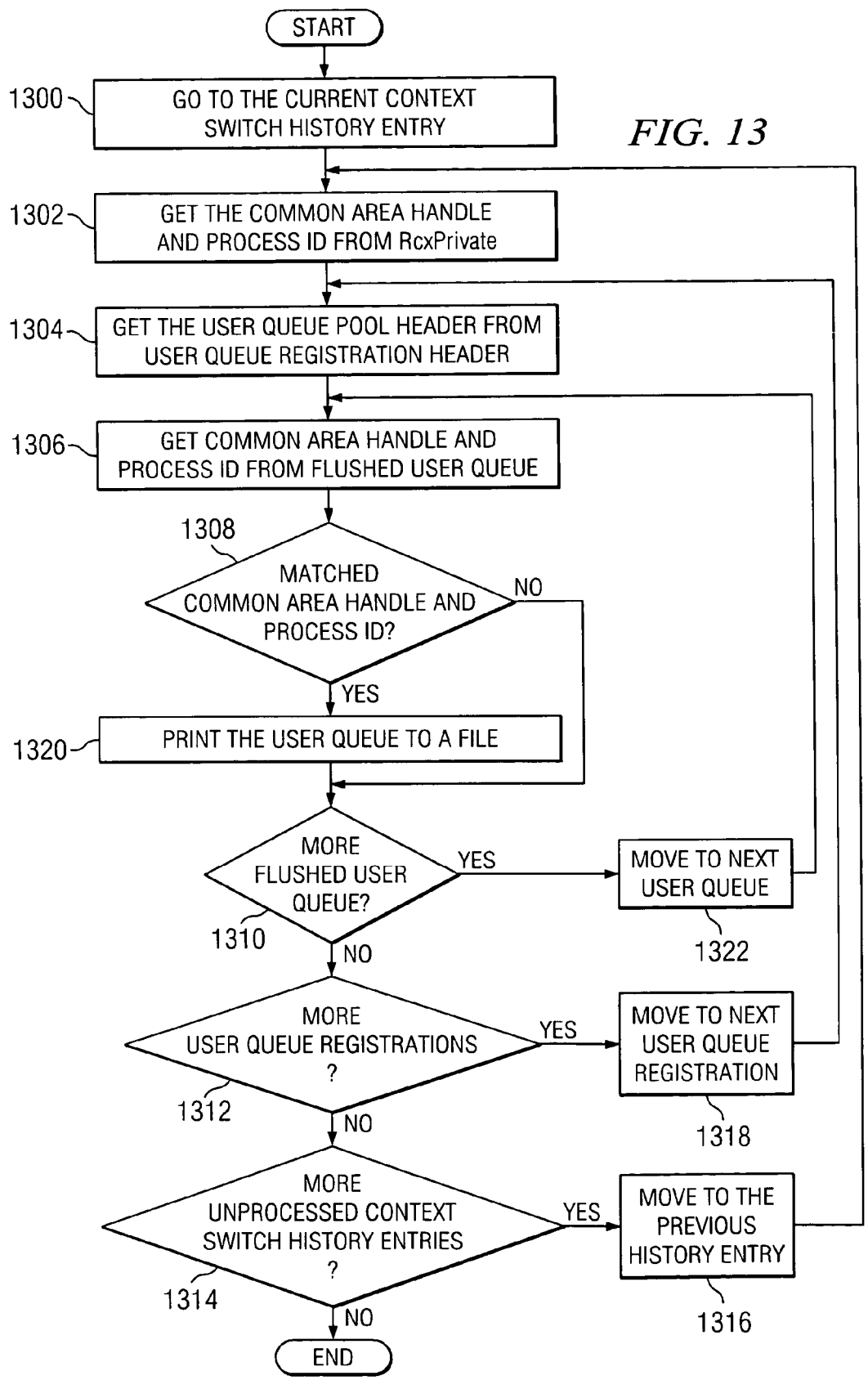
FIG. 13 is a flowchart of a process for user queue debugging in accordance with a preferred embodiment of the present invention.

With reference now to FIG. 13, a flowchart of a process for user queue debugging is depicted in accordance with a preferred embodiment of the present invention. The process illustrated in FIG. 13 may be implemented in a component, such as DMA resource 316 in FIG. 3. This process shows the collection of all flushed user queues in a backwards sequence of the context switch. The process may be changed to use a forward sequence depending on the implementation.

The process begins by selecting the current context switch history entry (step 1300). Next, the common area handle and the process ID from RcxPrivate is retrieved (step 1302). The user queue pool header is retrieved from the user queue registration header (step 1304). Next, the common area handle and the process ID from the flushed user queue is retrieved (step 1306).

Next, a determination is made as to whether the common area handle and process ID match (step 1308). If a match is not present, then a determination is made as to whether more flushed user queues are present for processing (step 1310). If more flushed user queues are not present, then a determination is made as to whether more user queue registrations are present (step 1312). If more user queue registrations are not present, then a determination is made as to whether there are more unprocessed context switch history entries (step 1314). If more entries are not present, the process terminates.

Referring back to step 1308, if the common area handle and process ID from the flushed user queue matches the RcxPrivate of the context switch history table entry, then the user queue is printed to a file (step 1320). The process then proceeds to step 1310 as described above. In step 1310, if more flushed user queues are present, then the next user queue is selected for processing (step 1322). The process then proceeds to step 1306 as described above. Referring back to step 1312, if more user queue registrations are present, then the next user queue registration is selected for processing (step 1318). The process then proceeds to step 1304 as described above. In step 1314, if more unprocessed context switch history entries are present for processing, then the previous history entry is selected (step 1316) with the process then proceeding to step 1302 as described above.

Figure 14:
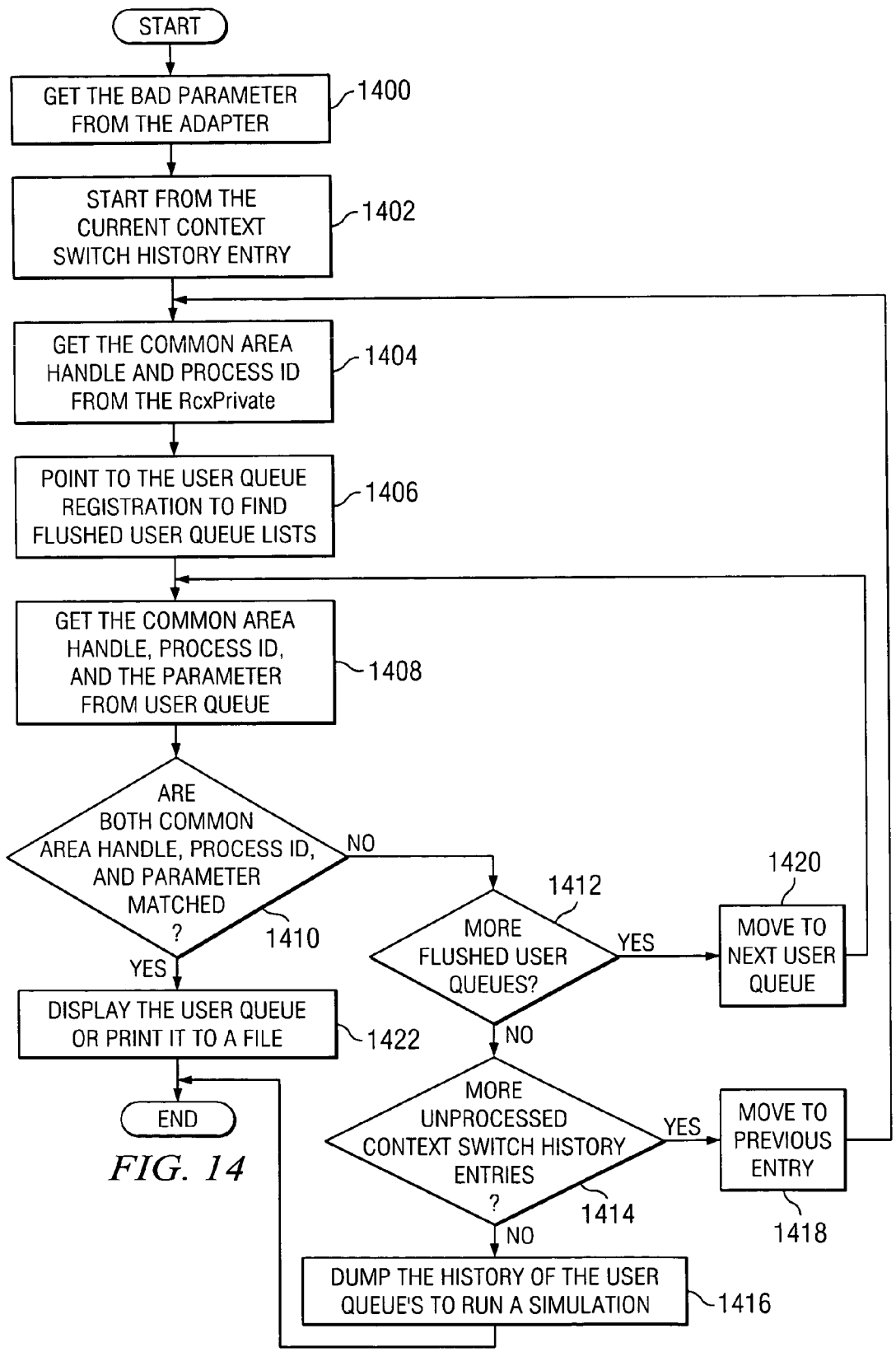
FIG. 14 is a flowchart of a process for specific user queue debugging in accordance with a preferred embodiment of the present invention.

With reference now to FIG. 14, a flowchart of a process for specific user queue debugging is depicted in accordance with a preferred embodiment of the present invention. The process illustrated in FIG. 14 may be implemented in a component, such as DMA resource 316 in FIG. 3.

The process begins by retrieving the bad parameter from the adapter (step 1400). For example, the user queue address the adapter was currently reading may have a bad parameter that is retrieved. Next, the current context switch history entry is selected (step 1402). Then, the common area handle and the process ID is retrieved from the RcxPrivate structure (step 1404). Then, the process points to the user queue registration to find flushed user queue lists (step 1406).

Next, the common area handle, process ID, and the parameter are obtained from the user queue (step 1408). Then, a determination is made as to whether the common area handle, process ID, and parameter from both the RcxPrivate structure and the flushed user queue entries matched (step 1410).

If a match is not present, then a determination is made as to whether more flushed user queues are present for processing (step 1412). If more unprocessed flushed user queues are absent, then a determination is made as to whether more unprocessed context switch history entries are present (step 1414). If more unprocessed entries are absent, then the process described in FIG. 13 is employed to dump the history of the user queue's to a file and run the simulation to recreate the problem (step 1416) with the process terminating thereafter.

Referring back to step 1414, if more unprocessed context switch history entries are present, then a previous entry is selected (step 1418). The process then proceeds to step 1404 as described above. In step 1412 is more flushed user queues are present, then next user queue is selected for processing (step 1420) with the process then proceeding to step 1408 as described above. Referring back to step 1410, if the common area handle, process ID, and parameter from both the RcxPrivate structure and the flushed user queue entries matched, then the user queue is displayed or printed to a file (step 1422) with the process terminating thereafter.

Thus, the present invention provides a method, apparatus, and computer instructions for managing user queues. The mechanism of the present invention allows for memory to be efficiently freed for other uses through the user of a history table containing information about prior context switches. This information also may be used for debugging processes as described above.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing direct memory access resources, the method comprising:

responsive to a change in context for a direct memory access resource, storing data relating to a context switch in a context switch history containing a number of prior context switches occurring prior to a current context, wherein the context switch history is a circular context switch history table used for freeing portions of memory used for direct memory access chain of requests; and freeing portions of the direct memory access chain of requests using the context switch history to form freed portions, wherein the freed portions are reused for requests.

2. The method of claim 1, wherein the portions are direct memory access queues.

3. The method of claim 2, wherein the freeing step comprises:

responsive to processing of requests, identifying a direct memory access queue for contexts prior to the current context to form an identified direct memory access queue; and freeing the identified direct memory access queue.

4. The method of claim 1, wherein the context switch history includes a pointer to a private structure for rendering the context, a pointer to a registration structure for pools of queues linked to the context, and an identifier for the thread.

5. The method of claim 1, wherein the change in context occurs when the direct access memory resource is available by a first thread and access to the direct access memory resource is granted to a second thread and wherein the direct access memory resource is made available to the second thread by adding a buffer of the second thread to an end of a direct memory access chain of requests for the first thread to generate a direct memory access request for the second thread.

6. The method of claim 5, wherein the direct memory access request is a zero length direct memory access request.

7. The method of claim 2 further comprising:
responsive to encountering an error from a parameter in a request in the direct memory access chain of requests, identifying a queue originating the parameter in the direct memory access chain of requests using the context switch history, wherein a bad hardware address is identified using the queue.

8. A data processing system for managing direct memory access resources, the data processing system comprising:
storing means, responsive to a change in context for a direct memory access resource, for storing data relating to a context switch in a context switch history containing a number of prior context switches occurring prior to a current context, wherein the context switch history is a circular context switch history table used for freeing portions of memory used for direct memory access chain of requests; and
freeing means for freeing portions of the direct memory access chain of requests using the context switch history to form freed portions, wherein the freed portions are reused for requests.

9. The data processing system of claim 8, wherein the portions are direct memory access queues.

10. The data processing system of claim 9, wherein the freeing means is a first freeing means and further comprising:
identifying means, responsive to processing of requests, for identifying a direct memory access queue for contexts prior to the current context to form an identified direct memory access queue; and
second freeing means for freeing the identified direct memory access queue.

11. The data processing system of claim 9 further comprising:
identifying means, responsive to encountering an error from a parameter in a request in the direct memory access chain of requests, for identifying a queue originating the parameter in the direct memory access chain of requests using the context switch history, wherein a bad hardware address is identified using the queue.

12. A computer program product in a computer readable medium for managing direct memory access resources, the computer program product comprising:
first instructions, responsive to a change in context for a direct memory access resource, for storing data relating to a context switch in a context switch history containing a number of prior context switches occurring prior to a current context, wherein the context switch history is a circular context switch history table used for freeing portions of memory used for direct memory access chain of requests; and
second instructions for freeing portions of the direct memory access chain of requests using the context switch history to form freed portions, wherein the freed portions are reused for requests.

13. The computer program product of claim 12, wherein the portions are direct memory access queues.

14. The computer program product of claim 13, wherein the second instructions comprises:
first sub-instructions, responsive to processing of requests, for identifying a direct memory access queue for contexts prior to the current context to form an identified direct memory access queue; and
second sub-instructions for freeing the identified direct memory access queue.

15. The computer program product of claim 12, wherein the context switch history includes a pointer to a private structure for rendering the context, a pointer to a registration structure for pools of queues linked to the context, and an identifier for the thread.

16. The computer program product of claim 12, wherein the change in context occurs when the direct access memory resource is available by a first thread and access to the direct access memory resource is granted to a second thread and wherein the direct access memory resource is made available to the second thread by adding a buffer of the second thread to an end of a direct memory access chain of requests for the first thread to generate a direct memory access request for the second thread.

17. The computer program product of claim 16, wherein the direct memory access request is a zero length direct memory access request.

18. The computer program product of claim 13 further comprising:
third instructions, responsive to encountering an error from a parameter in a request in the direct memory access chain of requests, for identifying a queue originating the parameter in the direct memory access chain of requests using the context switch history, wherein a bad hardware address is identified using the queue.

19. The method of claim 1, wherein each of the number of prior context switches in the context switch history is an entry in the context switch history, the entry comprising:
a private value;
a thread identifier;
a process identifier;
a save device buffer value; and
a load device buffer value.

20. The computer program product of claim 12, wherein each of the number of prior context switches in the context switch history is an entry in the context switch history, the entry comprising:
a private value;
a thread identifier;
a process identifier;
a save device buffer value; and
a load device buffer value.

* * * * *